United States Patent [19]

Sato

[11] 4,214,154
[45] Jul. 22, 1980

[54] LIGHT BEAM SCANNING APPARATUS
[75] Inventor: Hideaki Sato, Yokohama, Japan
[73] Assignee: Canon Kabushiki Kaisha, Tokyo, Japan
[21] Appl. No.: 952,053
[22] Filed: Oct. 17, 1978
[30] Foreign Application Priority Data Oct. 24, 1977 [JP] Japan ................................. 52-127797

[51] Int. Cl.² .............................................. G01J 1/20
[52] U.S. Cl. ...................................... 250/201; 250/235
[58] Field of Search ............... 358/132, 302; 250/234, 250/235, 236, 201

[56] References Cited
U.S. PATENT DOCUMENTS 4,002,830   1/1977   Brown et al. ........................ 358/293

*Primary Examiner*—David Nelms
*Assistant Examiner*—Darwin R. Hostetter
*Attorney, Agent, or Firm*—Fitzpatrick, Cella, Harper & Scinto

[57] ABSTRACT

A light beam scanning apparatus for scanning with a light beam from a light beam generating unit such as a laser is provided with at least a light beam detector on a scanning line of the light beam to detect the arrival of the light beam maintained in scanning motion by a scanner. The output of the detector energizes a first control to control the scanner thereby maintaining the maximum angle of rotation thereof at an approximately constant value. A beam detect signal released from the first control is utilized for determining the start position of information recording.

12 Claims, 5 Drawing Figures

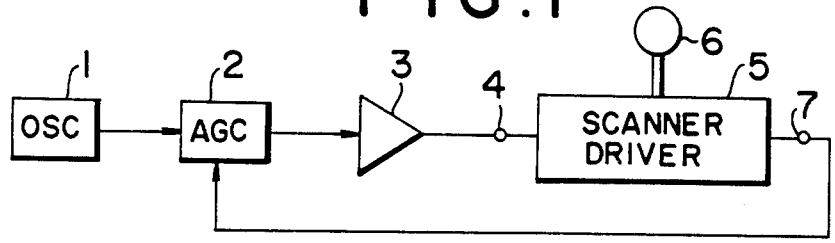
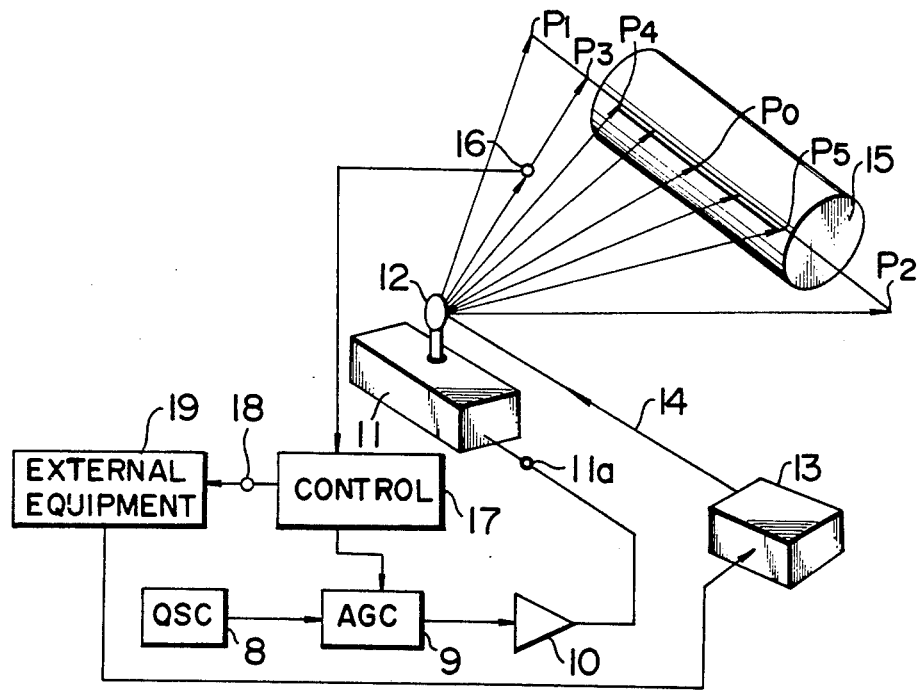
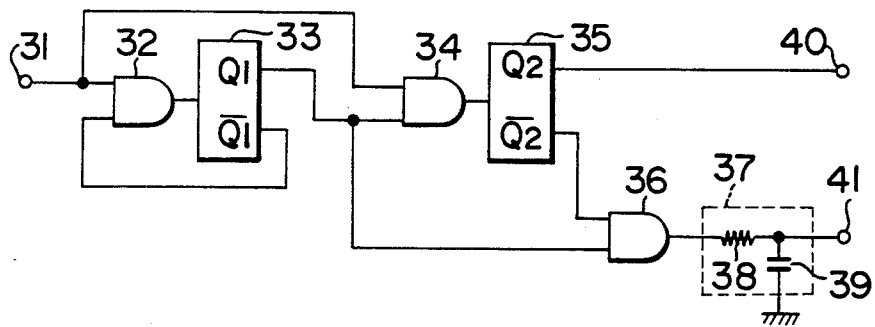

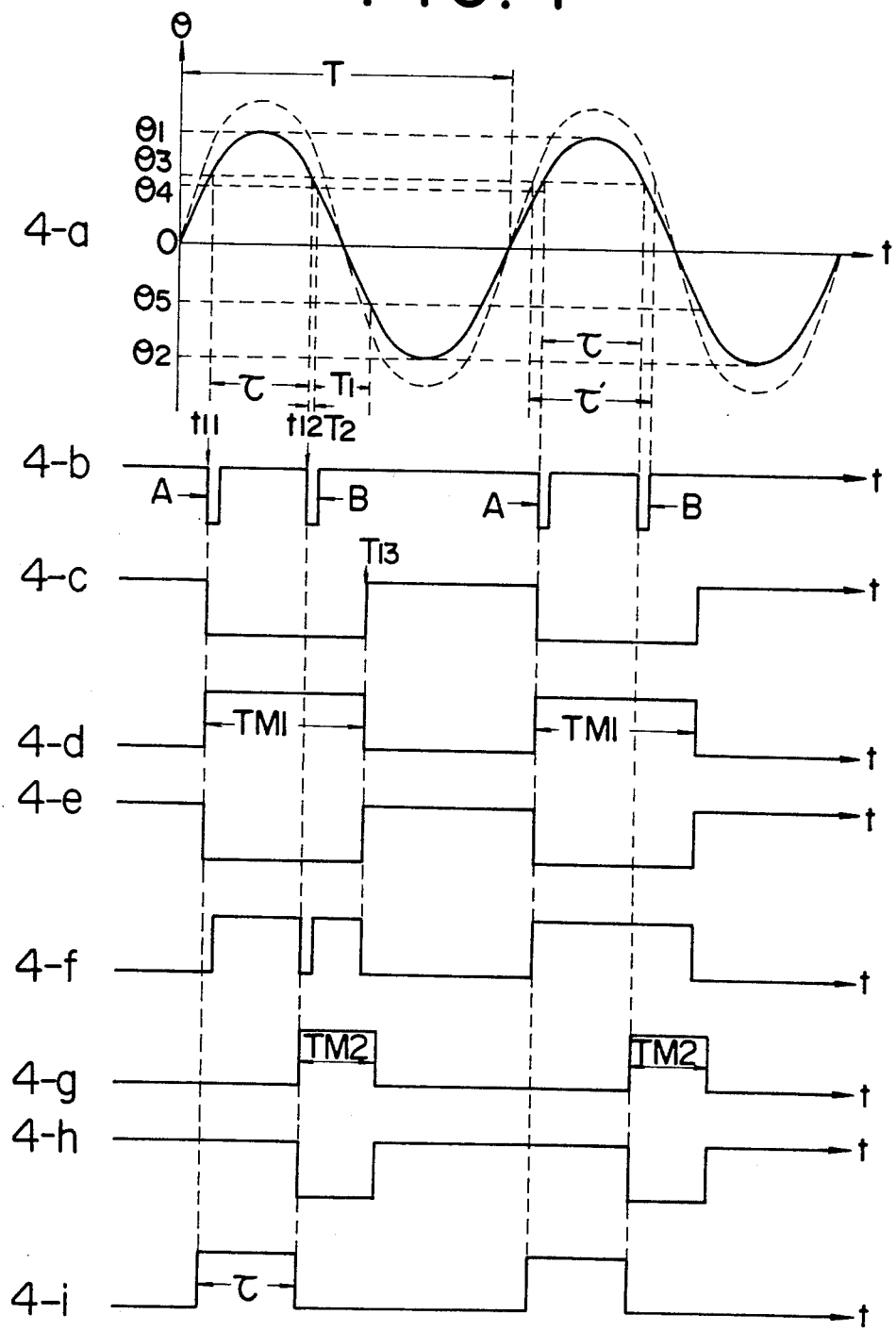

LIGHT BEAM SCANNING APPARATUS

BACKGROUND OF THE INVENTION

1. Field of the Invention

The present invention relates to light beam scanning apparatus capable of preventing distortion in an image recorded with a light beam.

2. Description of the Prior Art

In recording apparatus, such as a laser beam printer, facsimile etc., utilizing conventional light beam scanning apparatus (hereinafter referred to as scanner), a rotational angle of the scanner usually changes sinusoidally in time at a determined frequency in consideration of its drive efficiency and of achieving high-speed drive. Also in order to prevent a distortion in an image recorded with a light beam, the maximum angle of rotation of the scanner is required to be constant throughout the scanning lines. This has conventionally been achieved by the technique to be discussed with reference to FIG. 1, wherein there are schematically shown a sinusoidal oscillator 1 generating a signal of a frequency of vibration of the scanner and composed of a known oscillator such as an LC oscillator, CR oscillator, crystal oscillator, frequency synthesizer etc., an automatic gain control 2 (hereinafter referred to as AGC circuit), for example, composed of an attenuator consisting of a combination of a known lamp and a CdS photocell or an attenuator utilizing an FET, a power amplifier circuit 3, a scanner driver 5 having an input terminal 4 thereof, a mirror 6 for reflecting the light beam, and a terminal 7 for releasing information on an angle or rotation of the scanner.

The output of sinusoidal oscillator 1 is supplied through the AGC circuit 2, power-amplified through the power amplifier circuit 3 and drives the scanner driver 5 through the input terminal 4. In driver 5 there is provided a generator coaxial with the rotating shaft of the mirror 6 and consisting of a coil and a magnetic circuit to generate a voltage corresponding to a rotational anuglar velocity of the mirror 6, the voltage being transmitted to the AGC circuit 2 through the output terminal 7. The AGC circuit 2 functions to decrease or increase the output thereof respectively when the rotating angle of mirror 6 is excessively large or small thereby maintaining the angle of rotation of the scanner constant. In the above-mentioned method, however, due to the use of the principle of a generator for the measurement of amount of rotation wherein the output voltage V of the generator is associated with the magnetic flux $\phi$ in the coil by the following equation:

$$V \propto d\phi/dt \ldots \quad (1)$$

the output voltage V includes information on the rotational angular velocity of mirror 6 and not information on the angle of rotation thereof. Also stability of the voltage induced across the coil can hardly be guaranteed due to possible changes in the magnetic flux of the magnet constituting the generator or in the positional relationship thereof with respect to the coil, those changes being time- or temperature-dependent. Consequently the above-explained conventional method is insufficient for maintaining an exact angle of rotation.

SUMMARY OF THE INVENTION

An object of the present invention is to prevent distortion in an image recorded with a light beam.

Yet another object of the present invention is to maintain constant the maximum angle of rotation of the scanning means for causing a scanning motion of the light beam.

A still further object of the present invention is to define the position for starting the information recording by a beam detect signal.

BRIEF DESCRIPTION OF THE DRAWINGS

FIG. 1 is a schematic block diagram showing an example of a conventional light beam scanning apparatus;

FIG. 2 is a schematic diagram showing a first embodiment of the light beam scanning apparatus in accordance with the present invention;

FIG. 3 is the circuit diagram showing a control circuit shown in FIG. 2;

FIG. 4 shows timing charts showing various signals appearing at the points of the apparatus shown in FIGS. 2 and 3.

DESCRIPTION OF THE PREFERRED EMBODIMENT

Figure 5:
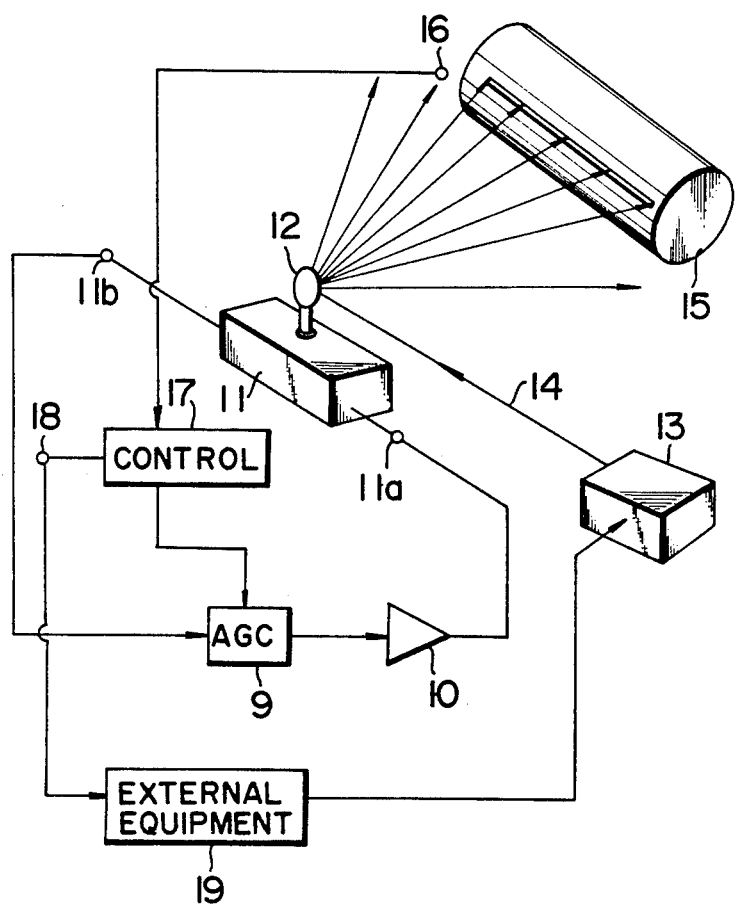
FIG. 5 is a schematic diagram showing a second embodiment of the light beam scanning apparatus in accordance with the present invention.

The present invention relates to light beam scanning apparatus for scanning with a light beam generated by a light beam generator, such as a laser, the apparatus being featured in at least a light beam detecting means provided along a scanning line of the light beam to control a scanning means in response to the output of the detecting means.

In the following there will be given an explanation on the first embodiment of the present invention with reference to the attached drawings. In FIG. 2 there are shown a sinusoidal oscillator 8, an AGC circuit 9, a power amplifier circuit 10, a driver 11 of the light beam scanning apparatus, a mirror (scanning means) 12, a light beam generator (light beam generating means) 13 such as a semiconductor laser, a light beam 14, a photosensitive drum 15 for conducting image recording thereon by means of light beam 14, an approximately central position PO of drum 15, extreme positions P1 and P2 at which the light beam 14 emitted from the light beam generator 13 at the maximum angle of rotation of mirror 12 should meet the surface of drum 15 whereby light beam 14 is capable of scanning the distance or length between points P1 and P2, a point P3 representing the position of a light beam detect means 16 projected onto drum 15, end positions P4 and P5 of the image recording on the drum 15, a control circuit (first control means) 17 for processing the output signal from light beam detect means 16 to produce a signal for controlling the AGC circuit and a pulse signal indicating that the light beam 14 will arrive at the recording start position P4 after a determined time (hereinafter referred to as "beam detect signal"), and an output terminal 18 for supplying the beam detect signal to an external equipment 19 such as a computer.

The output signal of said sinusoidal oscillator 8 drives the scanner driver 11 through the AGC circuit 9 and the power amplifier 10. The light beam 14 emitted from the light beam generator 13 is reflected by the mirror 12 and changes the direction according to the rotation of mirror 12. Beam detect means 16 generates a pulse signal when beam 14 passes through the position P3. The pulse signal is processed by the control circuit (first control means) 17 which produces a signal to control the AGC circuit 9. Also the beam detect signal developed from the output terminal 18 is utilized, through the external equipment 19 (second control means), to control the modulation of light beam 14 emitted from the light beam generator 13, thereby to initiate image recording from the position P4.

Now there will be given a detailed explanation on the principal feature of the present invention according to which an exact control of the angle of rotation is achieved based on the signal from the light beam detect means 16.

Referring to FIG. 3 showing an example of the control circuit 17, there are shown an input terminal 31 to the control circuit 17, AND circuits 32, 34 and 36, monostable multivibrators 33 and 35, a low-pass filter 37 composed of a resistor 38 and a capacitor 39, a beam detect signal output terminal 40, and an AGC circuit control signal output terminal 41. FIG. 4 shows time charts representing signal waveforms appearing at various points included in the apparatus in FIGS. 2 and 3 wherein the abscissa represents time in all the charts while the ordinate represents the angle of rotation $\theta$ of mirror 12 in chart 4-a and the voltage level in the charts 4-b through 4-i. In the chart 4-a the angles $\theta_1$, $\theta_2$, $\theta_3$, $\theta_4$ and $\theta_5$ respectively correspond to the positions, P1, P2, P3, P4 and P5 on the drum 15. In a normal state the mirror 12 rotates between the angles $\theta_1$ and $\theta_2$ corresponding to the light beam scanning the line from P1 to P2 on the drum 15 whereby the light beam is detected by the detect means 16 at the angle $\theta_3$ and the image recording is performed during the rotation in one direction between the angles $\theta_4$ and $\theta_5$. Stated differently during a cycle T of the rotation the period T1 alone is utilized for recording. During rotation of mirror 12 in a direction opposite to that for recording, the detector means 16 detects the light beam 14 upon passing thereof through the position P3 to supply a pulse A to the input terminal 31. After the lapse of a period $\tau$ the light beam 14 again passes through the position P3 and is detected by the detect means 16 to supply a pulse B to the input terminal 31, as shown in the chart 4-b. The monostable multivibrator 33 is energized when the output signal 4-c of the AND gate 32 changes to its low level, i.e., when the pulse A is introduced, to generate pulses of a time interval TM1 from the output terminal Q1. The output signals from the output terminals Q1 and $\overline{Q1}$ of multivibrator 33 are shown respectively in the charts 4-d and 4-e. The signal 4-e is an inverted signal of the signal 4-d, and the output signal 4-d from the terminal Q1 and the output signal 4-b are supplied to the AND circuit 34, of which the output signal is represented in the chart 4-f. Output signal 4-f is supplied to the monostable multivibrator 35 which is enabled when signal 4-f changes to its low level, i.e., when the pulse B is introduced, to produce pulse signals of a time interval TM2 from the output terminal Q2. The output signals from the output terminals Q2, $\overline{Q2}$ of multivibrator 35 are shown respectively in the charts 4-g and 4-h, of which the signal 4-g is released as the beam detect signal from the output terminal 40, and introduced into a record control circuit (not shown) which in turn releases a record start signal after a time interval T2. On the other hand the output signal 4-h is supplied, together with the output signal 4-d from the output terminal Q1 of monostable multivibrator 33, to the AND gate 36 which in turn releases an output signal 4-i. Signal 4-d assumes a high level at a time t11 when the pulse A is introduced into the input terminal 31 while the signal 4-h assumes a low level at a time t12 in response to the pulse B introduced into the input terminal 31. Consequently the signal 4-i is changed to its high level at time t11 and to its low level at time t12, thus remaining in the high level state only during the period $\tau$. Therefore, the pulse train constituting the signal 4-i can be considered as a kind of pulse-modulated signal in which the repeating period T remains constant but the pulse duration $\tau$ varies according to the change in the maximum angle of rotation of the scanner. In order that the signal 4-i can be composed of such pulses, there should exist the following relationship between TM1, TM2, $\tau$ and T:

$$0 < \tau < TM1 < TM2 + \tau < T \ldots \quad (2)$$

since the period TM1 should be longer than the period $\tau$ in order to inhibit energization of multivibrator 33 by the pulse B, the period TM2 should be longer than the period TM1 - $\tau$ in order to inhibit that the signal 4-f would otherwise assume a low level at time t13 to actuate the multivibrator 35 and the period TM2+$\tau$ should be selected shorter than the period T in order to avoid interference on the processing of pulses A and B in the succeeding cycle.

As the time constant of the aforementioned low-pass filter 37 is selected sufficiently longer than the cycle period T, the signal 4-i is smoothed by the filter and released through the output terminal 41 to control the AGC circuit 9. For instance, in case the angle of rotation of mirror 12 changes as represented by the broken line in the chart 4-a, the pulse duration in the signal 4-i is changed from $\tau$ to a larger value $\tau'$ so that the voltage smoothed through the low-pass filter 37 and supplied to the AGC circuit 9 becomes higher than normal, whereby the circuit detects the change in voltage so as to reduce the vibrating amplitude of the mirror 12. In the above-mentioned manner the scanning means is capable of maintaining the maximum angle of rotation thereof substantially constant and controlling the information recording start signal.

In FIG. 5 there is shown a second embodiment of the present invention, wherein components of the same functions as in FIG. 2 are represented by the same reference numerals. In this embodiment a generator similar to that shown in FIG. 1 is incorporated in the scanner, and the positional relationship between the magnet and coil in the generator is adjusted in such a manner that the outputs of the generator are in phase with that of the scanner drive circuit. In addition, as shown in FIG. 5, the output of a generator (not shown) provided in the driver 11 is positively fed back to the AGC circuit 9 through an output terminal 11b. In this manner there is generated an auto-oscillation in a loop comprising the AGC circuit 9, amplifier 10, driver 11 and the generator, so that the effect as explained as to the first embodiment can be obtained without employing another sinusoidal oscillating circuit.

As detailedly explained in the foregoing, the present invention makes it possible to maintain the maximum angle of rotation of the scanning means substantially constant and at the same time to determine the information recording start position in response to the beam detect signal.

What I claim is:

1. Light beam scanning apparatus comprising:
   a light beam generating means for generating a light beam;
   a scanning means for deflecting the direction of said light beam emitted from said light beam generating means;
   at least one light beam detect means provided on a scanning line formed by the deflected light beam; and
   a first control means for controlling the length of the scanning line according to an output of said light beam detect means.

2. Apparatus according to claim 1 wherein said first control means controls the maximum angle of rotation of said scanning means substantially constant.

3. Apparatus according to claim 2 wherein said scanning means comprises a mirror for reflecting said light beam.

4. Light beam scanning apparatus comprising:
   a light beam generating means for generating a light beam;
   a scanning means for deflecting the direction of said light beam emitted from said light beam generating means;
   at least one light beam detect means provided on a scanning line formed by the deflected light beam;
   a first control means for controlling the length of the scanning line according to an output of said light beam detect means; and
   a second control means for controlling a start position of image recording according to an output of said first control means.

5. Apparatus according to claim 4 wherein said first control means maintains the maximum angle of rotation of said scanning means substantially constant, and said second control means controls the modulation of said light beam.

6. Apparatus according to claim 5 wherein said scanning means comprises a mirror for reflecting said light beam.

7. Light beam scanning apparatus comprising:
   the scanning means for periodically changing a direction of a light beam;
   at least one light beam detect means provided on a scanning line formed by the scanning of said light beam caused by said scanning means; and
   a first control means for controlling the angle of rotation of said scanning means according to a time interval between two signals produced from said light beam detect means.

8. Apparatus according to claim 7 wherein said first control means performs a control in such a manner that the time interval between said two signals is inversely proportional to the angle of rotation of said scanning means.

9. Apparatus according to claim 8 wherein said scanning means comprises a mirror for reflecting said light beam.

10. Light beam scanning apparatus comprising:
    the scanning means for periodically changing a direction of a light beam;
    at least one light beam detect means provided on a scanning line formed by the scanning of said light beam caused by said scanning means;
    a first control means for controlling the angle of rotation of said scanning means according to a time interval between two signals produced from said light beam detect means; and
    a second control means for controlling a start position of image recording according to an output of said first control means.

11. Apparatus according to claim 10, wherein said first control means performs a control function in such a manner that the time interval between said two signals is inversely proportional to the angle of rotation of said scanning means, and said second control means controls the modulation of said light beam.

12. Apparatus according to claim 11 wherein said scanning means comprises a mirror for reflecting said light beam.

UNITED STATES PATENT OFFICE
CERTIFICATE OF CORRECTION

Patent No. 4,214,154  Dated July 22, 1980

Inventor(s) HIDEAKI SATO

It is certified that error appears in the above-identified patent and that said Letters Patent are hereby corrected as shown below:

Column 1, line 36, "or" should read --of--;

Column 1, line 44, "anuglar" should read --angular--;

Column 5, line 15, "controls" should read --maintains--;

Claim 7, Column 6, line 2, "the scanning" should read --a scanning-- and "a direc-" should read --the direc- --.

Claim 10, Column 6, line 20, "the scanning" should read --a scanning-- and "a direc-" should read --the direc- --.

Signed and Sealed this

Twentieth Day of January 1981

[SEAL]

Attest:

RENE D. TEGTMEYER

Attesting Officer  Acting Commissioner of Patents and Trademarks